United States Patent [19]

Sugimoto et al.

[11] 4,312,248

[45] Jan. 26, 1982

[54] METHOD FOR VEHICLE SUB-TRANSMISSION SHIFT CONTROL

[75] Inventors: Hiroshi Sugimoto, Aichi; Jiro Nakano, Okazaki, both of Japan

[73] Assignee: Toyota Jidosha Kogyo Kabushiki Kaisha, Toyota, Japan

[21] Appl. No.: 60,003

[22] Filed: Jul. 24, 1979

[30] Foreign Application Priority Data

Dec. 4, 1978 [JP] Japan .................. 53/150347

[51] Int. Cl.³ .................. B60K 41/10; B60K 41/06; F16H 37/00

[52] U.S. Cl. .................. 74/861; 74/740; 74/856; 74/864; 74/866

[58] Field of Search ............ 74/843, 866, 861, 863, 74/864, 856, 740, 752 D, DIG. 6

[56] References Cited

U.S. PATENT DOCUMENTS

| | | | |
|---|---|---|---|
| 2,637,222 | 5/1953 | Backus | 74/745 |
| 2,654,268 | 10/1953 | Perkins | 74/745 |
| 2,763,290 | 9/1956 | Perkins et al. | 74/745 X |
| 3,695,122 | 10/1972 | Irie et al. | 74/864 |
| 3,710,651 | 1/1973 | Marumo et al. | 74/864 |
| 3,759,344 | 9/1973 | Blee | 74/864 X |
| 3,827,315 | 8/1974 | Lupo | 74/863 |
| 3,939,722 | 2/1976 | Stromberg | 74/861 X |
| 3,942,293 | 3/1976 | Forster et al. | 74/866 |
| 3,943,799 | 3/1976 | Sakai | 74/866 |
| 4,102,222 | 7/1978 | Miller et al. | 74/866 |
| 4,172,505 | 10/1979 | Rabus et al. | 74/862 X |

FOREIGN PATENT DOCUMENTS 2813679 10/1978 Fed. Rep. of Germany ........ 74/866

Primary Examiner—Leslie Braun
Attorney, Agent, or Firm—Finnegan, Henderson, Farabow, Garrett & Dunner

[57] ABSTRACT

A method is disclosed for automatically shifting the subtransmission of a vehicle which is also equipped with a manual transmission operated by hand by the driver. When the driver shifts by hand to a certain gearing ratio, a vehicle operating parameter is detected, and, on the basis of this detected value, the procedure for shifting the sub-transmission is modified. Shift control of the sub-transmission is then performed in accordance with this modified sub-transmission shift procedure, while the manual transmission remains in this gearing ratio.

6 Claims, 8 Drawing Figures

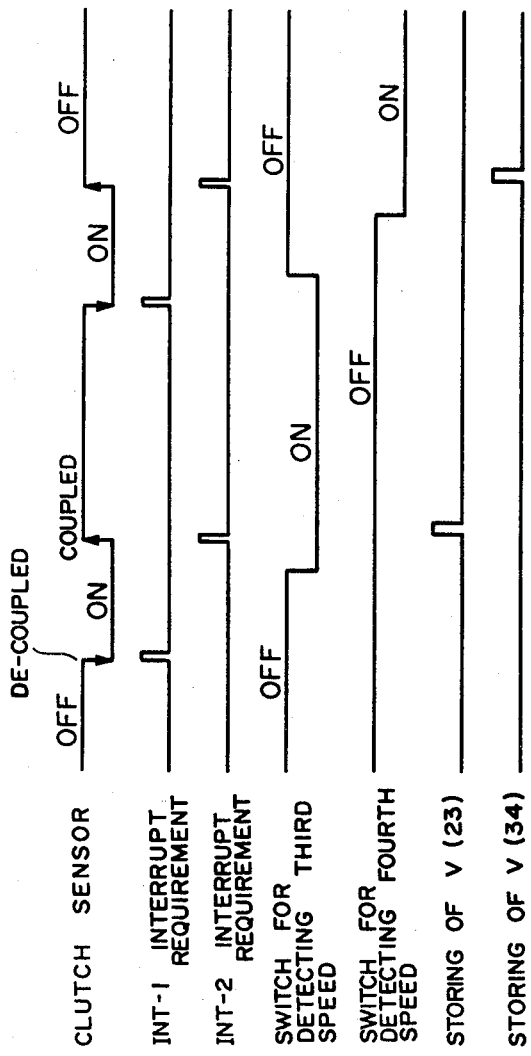

METHOD FOR VEHICLE SUB-TRANSMISSION SHIFT CONTROL

BACKGROUND OF THE INVENTION

The present invention relates to a shift control method for a sub-transmission incorporated into the power transmission system of a vehicle such as an automobile, and more particularly relates to a shift control method for performing properly the shifting of such a sub-transmission in accordance with the operating conditions of the vehicle, bearing in mind the style of driving and of gear shifting of the driver.

It is known to incorporate a two-speed sub-transmission, which can be shifted between a high speed stage and a low speed stage, into the power train of a vehicle such as an automobile which also is equipped with a manual transmission.

The control of such a sub-transmission has sometimes been manual; however, this puts a strain on the driver, and distracts him unduly from the business of vehicle control. As a result, such manual control has not been practical from the point of view of obtaining the proper shift timing of the sub-transmission to ensure good performance and fuel economy.

In order to avoid this problem, it has been proposed to control such a sub-transmission electrically or electronically, by shifting it over from the low speed stage to the high speed stage, and from the high speed stage to the low speed stage, automatically, depending upon combinations of various vehicle and/or engine operating parameters, such as the vehicle speed, the engine revolution speed, the throttle opening, the engine load, etc.. Typically, the shifting is performed in accordance with a transmission diagram, which is a line on a graph of a signal representing either vehicle speed or engine speed, against a signal representing engine load, such as the throttle opening.

Now, the shifting of the manual transmission is performed by the driver, according to his own free will, and the precise shift points will vary according to the driver's habits, the conditions of the road, and so on. If, therefore, the transmission diagram of the sub-transmission is determined independently of these conditions, and shifting of the sub-transmission is performed in accordance therewith, it may occur that this shifting is performed at times which rather go against the wish of the driver, as expressed by his particular current pattern of gear shifting.

For instance, if the driver currently does not perform upshifting until the speed of the vehicle has become relatively high, so that he is performing so-called high-revving or high acceleration operation, it is desirable that the sub-transmission, responding to this mode of operation, likewise should not shift from its low speed stage to its high speed stage until the vehicle speed has become relatively high. Thus the driving style of the driver and the sub-transmission will blend harmoniously.

If, on the other hand, the sub-transmission does not respond to this high-revving mode of operation by the driver, then the shift of the sub-transmission from its low speed stage to its high speed stage may occur almost immediately after the manual upshift by the driver, so that, in effect, high-revving operation is not performed, and the driver's intentions are frustrated.

Similarly if, on the other hand, the driver is currently in the habit of performing upshifting rather early, so that the vehicle is being operated in a low-revving or sedate mode, (which provides good fuel economy), then, again, if the automatic control of the sub-transmission does not respond to this mode of manual shifting, a rather long time will elapse after upshifting by the driver before the sub-transmission shifts from its low speed stage to its high speed stage, and thus low-revving operation of the vehicle will not take place, and again the driver's intentions will be frustrated.

SUMMARY OF THE INVENTION

Therefore, it is an object of the present invention to provide a shift control method for the sub-transmission of a vehicle, which performs the shift of the sub-transmission so as to continue and complement the method and style of engine operation desired by the driver and implemented by him via a manually shifted transmission.

According to the present invention, this object is achieved by a shift control method for a sub-transmission of a vehicle which is also equipped with a manual transmission operated by hand by the driver, comprising the steps, in order, of detecting the driver's shifting of the manual transmission at a certain gear ratio, measuring a vehicle operating parameter at a driver-determined shift point of the manual transmission to a certain gearing ratio, determining a sub-transmission shift procedure which relates to said gearing ratio of the manual transmission, on the basis of said detected value, and performing shift control of the sub-transmission in accordance with said driver-determined sub-transmission shift procedure, while the manual transmission is set to said gearing ratio.

As a particular species of the present invention, this vehicle operating parameter may be the vehicle speed. Alternatively, it may be the engine revolution speed.

BRIEF DESCRIPTION OF THE DRAWINGS

The present invention will become more fully understood by reference to the following description of a preferred embodiment, and to the accompanying drawings. It should be clearly understood, however, that the present invention is not intended to be limited in any way by any features of the shown embodiment, or of the drawings, which are all given by way of illustration and exemplification only. In the drawings:

FIG. 8 is a control time chart of the operation of the computer.

DESCRIPTION OF THE PREFERRED EMBODIMENT

Figure 1:
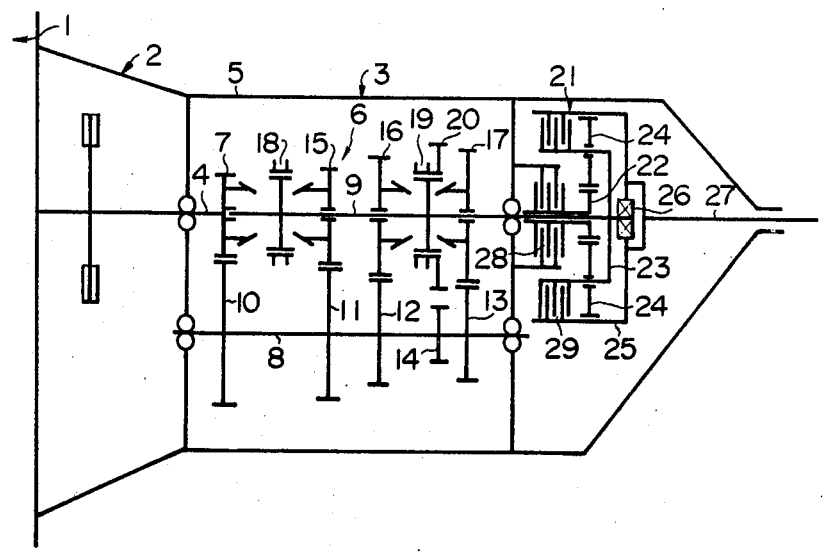
FIG. 1 is a skeleton diagram showing an example of a manual transmission with a sub-transmission, as used in a vehicle, and as controlled according to the method of the present invention.

FIG. 1 shows, in diagrammatic form, part of the transmission system of a vehicle which is equipped with a control system which practices the method of the present invention. Reference numeral 1 denotes the rear part of the engine of the vehicle, and the rotary power generated by this engine is transmitted, via a clutch apparatus 2, to an input shaft 4 of a manual transmission 3. This transmission 3 is of a conventional type. It includes in its case 5 a synchronous interlocking type main transmission apparatus 6 with four forward speed stages and one reverse speed stage, and it further includes an epicyclic gearing type sub-transmission 21 with two shift stages.

The input shaft 4 is supported rotatably in the case 5. Its one end has a gear 7 fixed thereto. The case 5 further supports rotatably a counter shaft 8, under said input shaft 4 in the drawing, and a driver shaft 9 on the same axis as that of said input shaft 4. The counter shaft 8 has five counter gears 10, 11, 12, 13, and 14 as one unit, and these gears all have different numbers of teeth. The counter gear 10 engages the gear 7 at all times, thereby transmitting rotary power from said input shaft 4 to said counter shaft 8. Said drive shaft 9 carries rotatably a third speed gear 15, a second speed gear 16, and a first speed gear 17, said third speed gear 15 engaging said counter gear 11, said second speed gear 16 engaging said counter gear 12, and said first speed gear 17 engaging said counter gear 13 at all times, so that the rotary power is transmitted from said counter shaft 8 to said three speed gears at all times.

Between said gear 7 and said third speed gear 15 a synchronizer 18 between third speed and fourth speed is provided, and between said second speed gear 16 and said first speed gear 17 a synchronizer 19 between first speed and second speed is provided. These synchronizers may be of a well known type, such as the Borg-Warner type. When the hub sleeve of said synchronizer 18 between third speed and fourth speed is shifted leftward in the figure, said drive shaft 9 is coupled with said input shaft 4, and fourth speed is provided, while, when the hub sleeve of said synchronizer 18 between third speed and fourth speed is shifted rightwards in the figure, said drive shaft 9 is coupled with said third speed gear 15 and third speed is provided. Further, when the hub sleeve of said synchronizer 19 between first speed and second speed is shifted to the left in the figure, said drive shaft 9 is coupled with said second speed gear 16, and second speed is provided, while, when the hub sleeve of said synchronizer 19 between first speed and second speed is shifted rightwards in the figure, said drive shaft 9 is coupled with said first speed gear 17, and first speed is provided.

Said synchronizer 19 between first speed and second speed has a reverse gear 20 in its hub sleeve. A reverse idler gear, not shown in the drawing, engages with this reverse gear 20 and said counter gear 14 selectively. When this engagement is performed, reverse speed stage is provided.

The shifting of said synchronizers 18, 19, and the reverse idler gear is performed by a manual shift lever not shown in the drawing in a manner which is per se well known.

The sub-transmission apparatus 21 has a sun gear 22 carried rotatably on said drive shaft 9; a plurality of planetary pinions 24 carried rotatably on the planetary carrier 23, which is coupled with said drive shaft 9 fixedly, and engages said sun gear 22; and a ring gear 25 engaging said planetary pinions. Said ring gear 25 is coupled with said drive shaft 9 by way of a one-way clutch 26, and is coupled fixedly with one end of the output shaft 27.

This one-way clutch 26 is adapted to engage together said drive shaft 9 and said ring gear 25, when the rotating speed of said drive shaft 9 reaches that of said ring gear 25. Further, the sub-transmission apparatus 21 includes a brake apparatus 28 which fixes said sun gear 22 selectively to the casing 5, and a clutch apparatus 29 which couples said planetary carrier 23 selectively to said ring gear 25, said brake apparatus 28 and said clutch apparatus 29 being operated by solenoid apparatuses 30 and 31 (not shown in FIG. 1, but schematically shown in FIG. 2), respectively.

Thus, it is seen that when the solenoid apparatus 30 for operating the brake 28 is energized, and the solenoid apparatus 31 for operating the clutch 29 is not energized, said brake apparatus 28 is operated, and said clutch apparatus 29 is not operated, whereby said sun gear 22 is fixed. Therefore, the rotary power of the drive shaft 9 is transmitted from the planetary carrier 23 to the output shaft 27 at a revolution speed which is increased by the operation of the planetary pinion 24 and the ring gear 25. On the other hand, when the solenoid apparatus 30 for the brake 28 is not energized, and the solenoid apparatus 31 for the clutch 29 is energized, said brake apparatus 28 is not operated, but said clutch 29 is operated, whereby said planetary carrier 23 is coupled with said ring gear 25, so that the sub-transmission apparatus 21 is in the direct coupled state. Thus the rotary power of the drive shaft 9 is transmitted to the output shaft 27 without changing of revolution speed.

Figure 2:
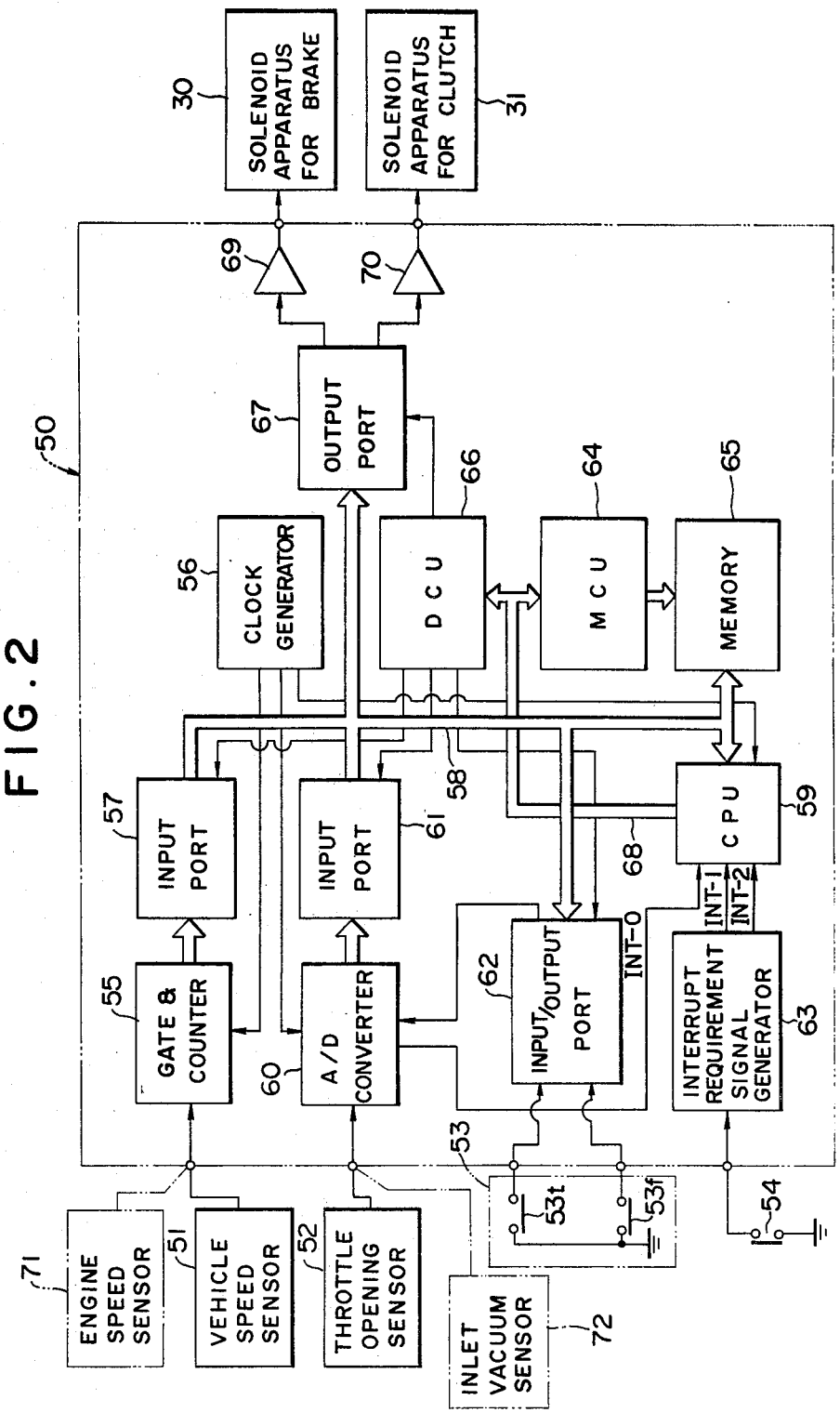
FIG. 2 is a block diagram, showing a shift control apparatus which practices a method which is an embodiment of the present invention.

FIG. 2 is a block diagram of an apparatus which performs an embodiment of the method of the present invention for shift control of the sub-transmission apparatus 21. This shift control apparatus has a computer 50 which receives signals generated by a vehicle speed sensor 51, a throttle opening sensor 52, a shift position sensor 53, and a clutch sensor 54, and which performs the energization and de-energization of said solenoid apparatuses 30 and 31 according to these signals.

The vehicle speed sensor 51 includes a magnet rotor rotating at a speed proportional to the vehicle speed, and a reed switch, not shown in the drawing, and generates a pulse signal. This signal is given to a gate counter circuit 55 as a gate signal. This gate counter circuit 55 also receives a clock signal from a clock signal generator circuit 56, counts clock pulses during one cycle of said gate signal, and gives the counted result to a central processing unit (CPU) 59, through an input port 57 and a bidirectional common bus 58 at a predetermined time. The throttle opening sensor 52 comprises a variable register, which responds to the opening of the throttle valve provided in the inlet system, which is not shown, of the engine 1, and which generates an analog signal (which in this embodiment is a voltage signal) varying in accordance with the throttle opening. The analog signal generated by the throttle opening sensor 52 is given to an A/D converter 60. The A/D converter 60 receives the clock signal from the clock generator 56 and converts said analog signal to a digital signal.

The digital signal generated by the A/D converter 60 is given to said CPU 59 through an input port 61 and the common bus 58 at a predetermined time. The shift position sensor 53 includes a switch for detecting the engagement of third speed, 53t, which gives a "0" signal to an input/output port 62 only when the manual transmission is in third speed, and a switch for detecting the engagement of fourth speed, 53f, which gives a "0" signal to said input/output port 62 only when the manual transmission is in fourth speed. The signal given from said shift position sensor 53 to said input/output port 62 is introduced to said CPU 59 through said common bus 58 at a predetermined time.

The CPU 59 receives the clock signal from the clock signal generator 56, and gives a conversion start signal to said A/D converter 60 through said common bus 58 and said input/output port 62, and receives an end of conversion signal (EOC signal) from said A/D converter as an interrupt requirement signal for the below-mentioned routine INT-0.

The clutch sensor 54 comprises an electrical switch, which gives a "0" signal to an interrupt requirement signal generator 63 while the clutch apparatus 2 is decoupled. The interrupt requirement signal generator 63 gives an interrupt requirement signal for the below-mentioned routine INT-1 to said CPU 59 when the signal given from said clutch sensor 54 changes from a "1" signal to a "0" signal, and gives an interrupt requirement signal for teh below-mentioned routine INT-2 to said CPU 59 when the signal given from said clutch sensor 54 changes from a "0" signal to a "1" signal.

The CPU 59 may be a per se well known processor, which includes a general register, an arithmetic circuit, a program counter, etc., and gives a control instruction signal to a memory control unit (MCU) 64, which controls a memory apparatus 65, and to a device control unit (DCU) 66, which controls said input port 57, 61, input/output port 62, and output port 67, through a control bus 68.

The memory apparatus 65 is connected to said CPU 59 through the bidirectional common bus 58. This memory apparatus 65 includes a read-only memory (ROM) and a random access memory (RAM). The read-only memory stores the program for computer routines and various coefficients for arithmetic operation, and the random access memory stores temporarily the signals generated by said vehicle sensor 51, throttle opening sensor 52, and shift position sensor 53, the other output signals, signal for temporarily evacuating the register, etc.

When the manual transmission apparatus is upshifted from second speed to third speed or from third speed to fourth speed, on the basis of the signals generated by said vehicle speed sensor 51, throttle opening sensor 52, shift position sensor 53, and clutch sensor 54, said CPU 59 calculates the optimum shift vehicle speeds V3H, V3L, or V4H, V4L, depending on the throttle opening, on the basis of the vehicle speed at that upshift time. Herein, V3H is the optimum upshift vehicle speed for the substransmission 21 when the manual transmission is in third speed, V3L is the optimum downshift vehicle speed for the sub-transmission 21 when the manual transmission is in third speed, V4H is the optimum upshift vehicle speed for the sub-transmission 21 when the manual transmission is in fourth speed, and V4L is the optimum downshift vehicle speed for the sub-transmission 21 when the manual transmission is in fourth speed. These optimum shift vehicle speeds are determined by the following equations:

$$V3H = f(t, V(23))$$

$$V3L = f'(t, V(23))$$

$$V4H = g(t, V(34))$$

$$V4L = g'(t, V(34))$$

Herein f, f', g, and g' are functions of two variables, t is the throttle opening, V(23) is the vehicle speed when the manual transmission has last been upshifted from second speed to third speed, and V(34) is the vehicle speed when the manual transmission has last been upshifted from third speed to fourth speed. The optimum shift vehicle speeds are thus determined by the vehicle speed and the throttle opening at the time of last upshift, and becomes a value according to a transmission diagram shown in FIG. 3 as an example.

The CPU 59 performs a comparison between said optimum shift vehicle speed and the real running vehicle speed V given from said vehicle speed sensor 51, moment by moment, and gives an energization instruction to the solenoid apparatus for the brake 30 through said common bus 58, output port 67, and a first amplifier 69, when V is greater than or equal to V3H, or V is greater than or equal to V4H, while it gives an energization instruction to the solenoid apparatus for the clutch 31 through said common bus 58, output port 67, and a second amplifier 70, when V is less than V3L or V is less than V4L.

Figure 4:
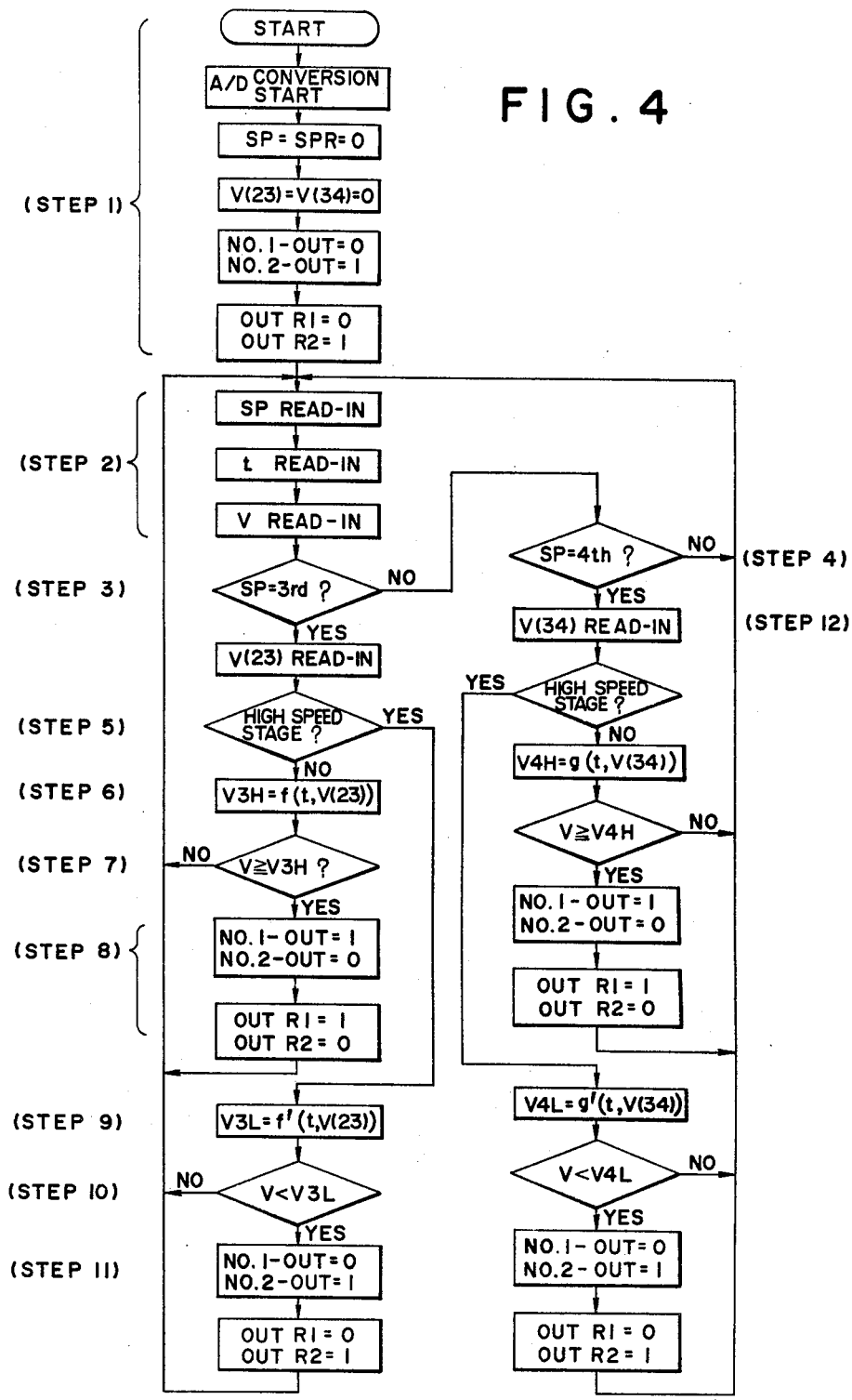
FIG. 4 is a control flow chart of the main routine of the computer.

In the following, the main routine of the computer 50 will be explained by a control flowchart which is shown in FIG. 4. Among the symbols used in the flowchart, SP is the transmission stage of the manual transmission at the time that the clutch apparatus 2 is coupled, SPR is the transmission stage of the manual transmission at the time that the clutch apparatus 2 is decoupled, No. 1-OUT is the output signal for the solenoid apparatus for brake 30, and No. 2-OUT is the output signal for the solenoid apparatus for clutch 31.

[step 1]

This step is an initiation step when the power source is connected to the computer 50. At this time, No. 1-OUT is set to "0" and No. 2-OUT is set to "1", in order to set the sub-transmission 21 in the low speed stage. [step 2]

In this step, the transmission stage SP of the manual transmission, the throttle opening t, and the vehicle speed V when the clutch apparatus 2 is connected, are loaded in the general register in CPU 59.

[step 3 and step 4]

In this step the discrimination between third and fourth stages of the manual transmission is done. In this embodiment, when the transmission stage of the manual transmission is not in third speed or fourth speed, shift control of the sub-transmission 21 is not performed, so that control is returned to [step 2].

[step 5]

This step discriminates whether the sub-transmission 21 is in the low speed stage or in the high speed stage by the information OUTR1, OUTR2 stored in RAM of the memory apparatus 65.

[step 6]

This step is performed if the sub-transmission 21 is in the low speed stage. In this step, the optimum upshift vehicle speed V3H for third speed is calculated with the aid of V(23) given and stored by an interrupt routine INT-2 and the newest value of the throttle opening t read in [step 2].

[step 7]

In this step, a comparison between said optimum upshift vehicle speed V3H obtained in [step 6] and the real running vehicle speed V read in in [step 2] is done, and the sub-transmission 21 is shifted to the high speed stage, when V is greater than or equal to V3H. On the other hand, when V is less than V3H, the subtransmission 21 may remain in the low speed stage, so that control is returned to [step 2].

[step 8]

This step is an output routine for shifting said sub-transmission 21 to the high speed stage, and generates an electrical signal for shifting said sub-transmission 21 to the high speed stage as an output signal and stores the same information as this output signal in the predetermined addresses OUTR1, OUTR2 of RAM in the memory apparatus 65.

[step 9]

This step is performed if the sub-transmission 21 is currently in the high speed stage. In this case, the optimum downshift vehicle speed V3L for the third speed is calculated.

[step 10]

In this step a comparison between said optimum downshift vehicle speed V3L obtained in [step 9] and the real running speed of the vehicle V is done, and the sub-transmission 21 is shifted to the low speed stage, when V is less than V3L. On the other hand, when V is not less than V3L, the sub-transmission 21 may remain in the high speed stage, so that control is returned to [step 2].

[step 11]

This step is an output routine for shifting said sub-transmission 21 to the low speed stage, and generates an electrical signal for shifting said sub-transmission 21 to the low speed stage as an output signal.

In [step 4], if the transmission stage of the manual transmission gear is in the fourth speed, control jumps from [step 4] to [step 12]. The steps after [step 12] are similar to the steps after [step 5].

Figure 5:
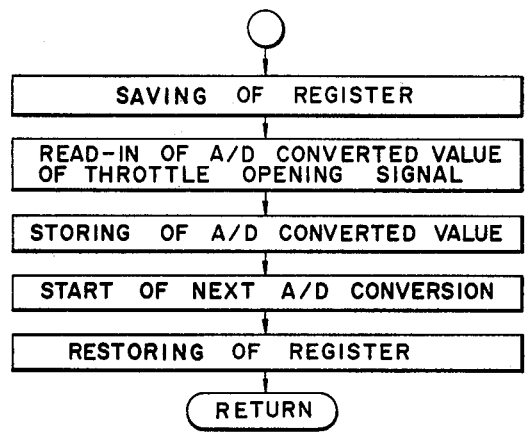
FIG. 5 is a control flow chart of an interrupt routine, INT-0.

In the following, an interrupt routine INT-0 for a first preferential interruption will be explained by a control flow chart shown in FIG. 5. The interrupt routine INT-0 is utilized for converting the input signal from the throttle opening sensor 52, which is an electrical signal proportional to the throttle opening, to a digital signal by the A/D converter 60. A conversion start signal for the A/D converter 60 is given by this routine, excepting that the first conversion start signal is given in the initiation step of the abovementioned main routine.

When the A/D converter 60 receives the conversion start signal from the CPU 59 through the input/output port 62, the A/D conversion is started. After a time determined previously by the A/D converter 60, a conversion end signal, namely the EOC signal, is generated. This signal is given to the CPU 59, as the interrupt requirement signal for INT-0. Once the CPU 59 receives this interrupt requirement signal, the program counter is transferred to the top number of the location area of the processing routine INT-0 automatically. At this time, the contents, which are necessary for the next processing and stored in the general register of CPU 59, are transferred to the random access memory of the memory apparatus 65 temporarily, and are written in therein. Namely, the general register is saved. After that, the A-D converted value is given from the input port 61 to the CPU 59 through the common bus 58, and is written in in the predetermined address of the access memory in the memory apparatus 65. After this, the next A-D conversion start signal is generated by the CPU 59, and the contents of the general register, which have been stored in the random access memory, are restored from the memory to the general register of the CPU 59. After that, a return instruction is generated by CPU 59, whereby the program counter returns to the address implemented directly before the interruption.

Further, in the case that high speed read in of the A/D converted value is unnecessary, a predetermined clock pulse may be used as the interrupt requirement signal instead of the EOC signal.

Figure 6:
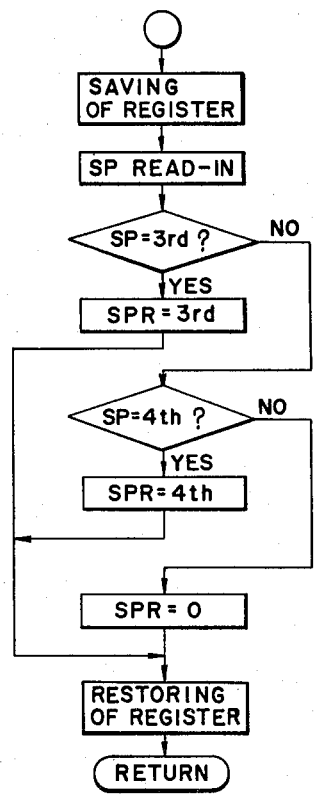
FIG. 6 is a control flow chart of an interrupt routine, INT-1.

Next an interrupt routine INT-1 for a second preferential interruption will be explained by a control flow chart shown in FIG. 6 and a control time chart shown in FIG. 8. The interrupt routine INT-1 is started by the interrupt requirement signal, which is generated by the interrupt requirement signal generator 63 in accordance with the signal generated by the clutch sensor 54 when the clutch 2 is decoupled, as shown in the control time chart of FIG. 8. When the interrupt requirement signal for INT-1 enters in the CPU 59, the CPU 59 starts to implement this interrupt routine INT-1 in a manner similar to the abovementioned interrupt routine INT-0. However, while CPU 59 is performing the interrupt routine INT-0, the implementation of the interrupt routine INT-1 stands by until the completion thereof.

CPU 59 saves the contents of the general register, then receives the transmission stage signal of the manual transmission from the input/output port 62 through the common bus 58, and stores this signal in the predetermined address in the random access memory of the memory apparatus 65. The input/output port 62, on the basis of signals received from the switch for detecting third speed, 53t, and the switch for detecting fourth speed, 53f, is able to detect the transmission stage of the manual transmission (but is of course not able to detect the difference between first, second, reverse, and neutral gears). The CPU 59 receives this detected result and writes SPR=4 when it is fourth speed, or SPR=0 when it is other than third speed or fourth speed, in the memory apparatus 65. After this, CPU 59 restores the contents of the general register and then generates the return instruction.

Figure 7:
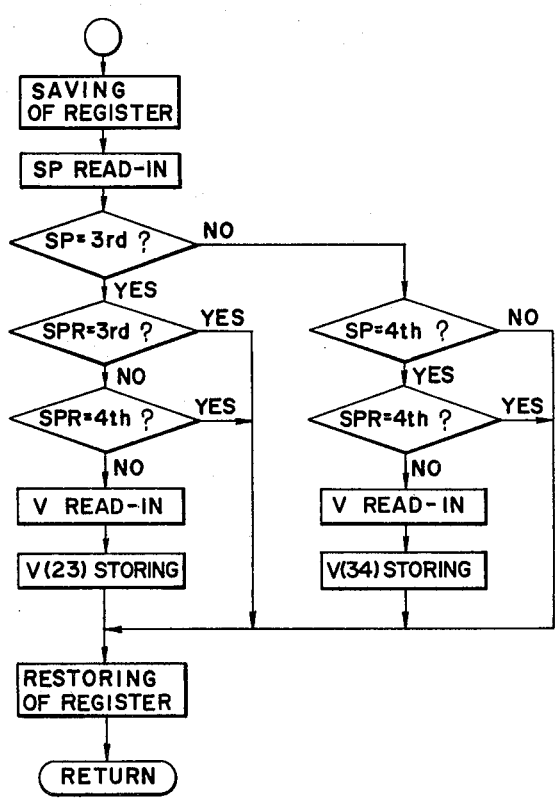
FIG. 7 is a control flow chart of an interrupt routine, INT-2.

Next, an interrupt routine INT-2 for a third preferential interruption will be explained by a control flow chart shown in FIG. 7 and a control time chart shown in FIG. 8. This interrupt routine INT-2 is started by the interrupt requirement signal for INT-2, which is generated by the interrupt requirement signal generator 63 in accordance with the output signal of the clutch sensor 54 when the clutch apparatus 2 is coupled, as shown in FIG. 8.

This routine begins by reading in SP. When the transmission stage of the manual transmission after the clutch operation is other than third speed or fourth speed, this routine does nothing and returns to its start point. In the case that the transmission stage of the manual transmission after the clutch operation is the third speed, when the previous transmission stage of the manual transmission, namely SPR stored in the memory apparatus by the abovementioned interrupt routine INT-1, is the third speed or the fourth speed, the shift is regarded as being a downshift, and this routine does nothing and returns to its start point. In a case other than this, the shift is regarded as an upshift from second speed, and the vehicle speed V at that time is given to CPU 59, so that the vehicle speed V(23) at the time of the upshift to third speed is stored in the predetermined vehicle speed memory address of the random access memory in the memory apparatus 65. And, in the case that the transmission stage of the manual transmission after the clutch operation is fourth speed, when SPR is fourth speed, the shift is not an upshift, so that this routine does nothing, and returns to the start point. In any case other than this, the shift is regarded as an upshift, and the vehicle speed V(34) at the time of the upshift to the fourth speed is stored in the predetermined vehicle speed memory address of the random access memory in the memory apparatus 65. Then the return instruction is generated by CPU 59.

In the abovementioned embodiment, when the transmission stage of the manual transmission becomes third speed or fourth speed by the upshift operation, the transmission point of the sub-transmission is calculated as the vehicle speed depending on the throttle opening in dependence on the vehicle speed at the time of that upshift, and the shift control signal from the low speed stage to the high speed stage or from the high speed stage to the low speed stage is given to the sub-transmission on the basis of the comparison between that vehicle speed and the real vehicle speed. As the transmission point of the sub-transmission is determined on the basis of the vehicle speed at the time of the upshift of the manual transmission, the sub-transmission can be shifted so as to continue the operating performance which is desired by the driver, and is determined on the basis of the shifting of the manual transmission by hand by the driver.

The above described shift control of the sub-transmission may be done, if necessary, in all forward transmission stages of the manual transmission, and also in the transmission stages set by downshifting. Such modifications will be easy for one skilled in the art, based upon the foregoing disclosure.

Figure 3:
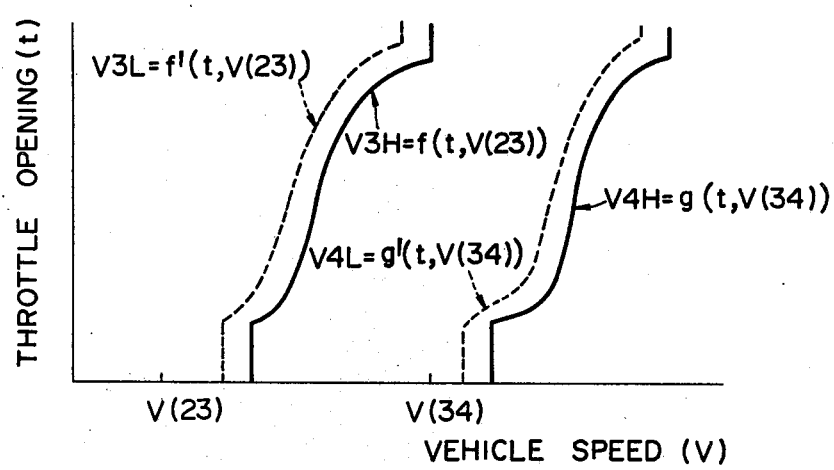
FIG. 3 is a graph, which is a transmission operating diagram of the sub-transmission.

The transmission diagram of the sub-transmission shown in FIG. 3 may vary in its slope and shape in dependence on the vehicle speed at the time of the transmission shift on the manual transmission. Furthermore, the abovementioned control may be performed by using an engine speed signal generated from an engine speed sensor 71 shown in FIG. 2, instead of a vehicle speed signal, and by using a signal generated from an inlet manifold vacuum sensor 72 shown in FIG. 2, instead of a throttle opening signal.

Although the invention has been shown and described in terms of a preferred embodiment thereof, it should be understood that various changes, modifications, and omissions of the form and the detail of any particular embodiment may be made by one skilled in the art, without departing from the principles of the present invention, or from its scope or spirit. Therefore it is desired that the protection afforded by Letters Patent should not be in any way limited by any details of the shown embodiment, or of the drawings, but solely by the appended claims.

We claim:

1. A shift control method for a subtransmission of a vehicle is also equipped with a manual transmission operated by a driver, said method comprising the steps, in order, of:

detecting said driver's shifting of said manual transmission at a certain gearing ratio;

measuring a value of a parameter related to vehicle speed and a value for throttle opening at said driver's shift point of the manual transmission set to said certain gearing ratio;

determining, on the basis of said certain gear ratio, and the value of said measured parameter values, a sub-transmission shift line for said certain gear ratio, said shift line indicating the relationship between said parameter related to the vehicle speed and the throttle opening when said sub-transmission is to be shifted;

and performing shift control of the sub-transmission in accordance with said sub-transmission shift line, while the manual transmission is set to said gearing ratio.

2. The method of claim 1, wherein said parameter related to vehicle speed is vehicle speed.

3. The method of claim 1, wherein said parameter related to vehicle speed is engine speed.

4. The method of claim 1 or 2, wherein the vehicle is equipped with a clutch, and wherein said driver's shifting is detected by detecting the operation of said clutch.

5. The method of claim 4, wherein the disengagement of said clutch is detected to initiate a process of determining the shift state of the manual transmission before shifting and wherein the re-engagement of said clutch is detected to initiate determination of the sub-transmission shift line.

6. The method of claim 1 wherein the step of determining said sub-transmission shift line is performed by a computer.

* * * * *